United States Patent
Rodden et al.

(10) Patent No.: US 6,311,932 B1
(45) Date of Patent: Nov. 6, 2001

(54) YAW STEERING MOMENTUM SYSTEM (75) Inventors: John J. Rodden, Los Altos; Xenophon H. Price, Redwood City, both of CA (US)

(73) Assignee: Space Systems/Loral Inc., Palo Alto, CA (US)

(*) Notice: Subject to any disclaimer, the term of this patent is extended or adjusted under 35 U.S.C. 154(b) by 0 days.

(21) Appl. No.: 09/451,158

(22) Filed: Nov. 30, 1999

(51) Int. Cl.[7] .............................. B64G 1/28; B64G 1/00; B64G 1/22; B64G 1/10
(52) U.S. Cl. .................. 244/165; 244/158 R; 244/176
(58) Field of Search ..................... 244/171, 165, 244/158 R, 176; 701/4, 13

(56) References Cited

U.S. PATENT DOCUMENTS

| | | | |
|---|---|---|---|
| 4,071,211 | 1/1978 | Muhlfelder et al. | 244/165 |
| 4,521,855 | * 6/1985 | Lehner et al. | 244/164 |
| 5,184,790 | 2/1993 | Fowell | 244/165 |
| 5,354,016 | * 10/1994 | Goodzeit et al. | 244/165 |
| 5,556,058 | * 9/1996 | Bender | 244/171 |
| 5,791,598 | 8/1998 | Rodden et al. | 244/165 |
| 5,931,421 | 8/1999 | Surauer et al. | 244/165 |
| 5,996,941 | * 12/1999 | Surauer et al. | 244/165 |

OTHER PUBLICATIONS

Dynamic Momentum Bias For Yaw Steering by Rodden et al. Presented at International Federation on Automatic Control 13th Triennial World Congress in San Francisco, Summer of 1994 6 Pages.

Attitude and Orbit Control System Design for the Globalstar Telecommunications Satellite by Rodden et al. Presented at International Federation on Automatic Control 13th Triennial World Congress in San Francisco, Summer of 1994 6 Pages.

* cited by examiner

Primary Examiner—Charles T. Jordan
Assistant Examiner—Christian M. Best
(74) Attorney, Agent, or Firm—Perman & Green, LLP

(57) ABSTRACT

A continuous three axes satellite pointing system for a solar powered satellite, the system comprising a body control module for producing three orthogonal axes body control torques, a momentum integration module, a momentum control module, and a program torque decoupling module. The program torque decoupling module de-couples the programmed motion parameters represented by the equation:

$$I_B\omega' + {}_B\omega X(I_B\omega + {}_BH).$$

17 Claims, 8 Drawing Sheets

FIG.2

FIG. 3
YAW STEERING GEOMETRY

FIG.4

FIG.5 SIMPLE TORQUE INTEGRATION

FIG.6
MOMENTUM BIAS STABILIZATION

FIG.7
WHEECON COUPLING OF ROLL
TORQUE INTO YAW

FIG.8

YAW STEERING MOMENTUM SYSTEM

BACKGROUND OF THE INVENTION

1. Field of the Invention

The present invention relates to systems for attitude control of Earth-orbiting satellites and, more particularly, to yaw steering control of a satellite that maintains programmed sun pointing for solar power generation.

2. Prior Art

Systems for satellite motion control, and in particular for dual-orientation orbital attitude control, are known, such as disclosed in U.S. Pat. No. 5,791,598. These systems may be used for controlling the solar fixation of a nadir-pointing satellite that is employed in communications systems, e.g., the GLOBALSTAR™ communications satellite system. In general these systems employ a bias momentum scheme which provides gyroscopic stability. As noted in the patent, attitude control of satellites is straight forward when three-axis sensor information is available, such as 1) an earth horizon sensor providing pitch and roll information, and 2) a sun sensor measuring yaw. However, during the solar-eclipse that occurs each time a satellite orbits the earth, such sun-sensor data is not available. This results in a gap in the yaw sensing information during each orbiting period.

Supplemental sensors can be added to the satellite, but this still does not assure continuous yaw information. For example, a magnetometer can be used to supply supplemental yaw data. But, as the satellite orbits through the earth's higher latitudes, the earth's magnetic pole tilts toward the satellite and the satellite's magnetometer data becomes too inaccurate to provide adequate attitude control during magnetic eclipses that occur at such latitudes. In addition, for high altitudes, including the geo-synchronous altitude, magnetic attitude references are unusable.

Major challenges presented in designing communications satellites, such as the GLOBALSTAR™ communications satellite system, is 1) the need to operate without continuous yaw information while providing continuous controlled-yaw motion, and 2) the need for particularly critical and complex attitude control. The communications antennas of such satellites are conventionally mounted on the portion of the satellite that is always nearest to the earth, which is referred to as a "nadir-pointing" attitude, and this attitude must be maintained at all times. Attitude control is particularly critical for communications relay satellites, such as those used in the GLOBALSTAR™ satellite cellular phone system, because they also have very high power requirements. Efficient operation of the solar panels on these satellites requires that the sun's rays be normal to the plane surface of the solar panels at all times. Therefore, reliable, precise satellite attitude control is essential to the GLOBALSTAR™ satellite system's mission and certain systems that have been proposed and implemented may be used to this end. Exemplary systems for this purpose include the following.

a. Whecon Stabilization

Momentum-bias attitude stabilization systems have successfully been used to provide precise attitude stabilization for fixed-orbit nadir-pointing satellites, without direct yaw sensing. The Wheel-Control or "Whecon" system, described in the article "Analysis and Design of Whecon—an Attitude Control Concept", by H. J. Dougherty, E. D. Scott, and J. J. Rodden, AIAA paper no. 68–461, AIAA 2nd Communications Satellite Systems Conference, San Francisco, Apr. 8–10, 1968, is an example of such a system. The Whecon bias-momentum system provides three-axis satellite stabilization in response to pitch and roll signals from an earth-horizon sensor. Whecon then controls the residual yaw errors through a dynamic coupling of yaw with the orbital pitch rate.

The Whecon system uses: 1) a momentum wheel having a fixed alignment with the spacecraft pitch axis; 2) horizon sensors that detect pitch and roll attitude errors; and 3) mass expulsion devices for responding to those errors, all without direct yaw sensing. However, the momentum wheel's inertia restrains vehicle yaw rotations to small perturbations about zero. This attitudinal rigidity makes the Whecon system inapplicable to solar-powered communications satellite systems that have orbits that precess, such as the system. Also, mass expulsion systems use non-renewable energy sources that limit the working life of the satellite.

The use of momentum for attitude control, instead of mass expulsion engines, is a concept that is attractive for its simplicity. However, this type system, which was used on a number of U.S. and international synchronous satellites, including military satellites, Intelsat V, and the Canadian Communication Technology Satellite, also uses mass expulsion to provide control torque.

b. Seasat Nadir-pointing Momentum Bias

This all-momentum-wheel version of the Whecon attitude stabilization system was developed for the NASA-JPL Seasat satellite, which flew in 1978. This system is described in the article "Seasat A Attitude Control System", by R. Weiss, J. J. Rodden, R. W Hendricks and S. W. Beach, pp 6–13, Journal of Guidance and Control, vol. 1, no. 1 (1978). The Seasat platform uses momentum wheels for the orbital momentum bias necessary to maintain a nadir-pointing attitude, as well as for vehicle stabilization, instead of using mass expulsion to produce the bias momentum.

Attitude sensing is performed by a pair of "scan" wheels on the satellite. Seasat provides magnetic compensation for the momentum wheels, referred to as "desaturation", to counter the momentum produced by sources of torque that are external to the vehicle, including the earth's gravitational and magnetic fields.

Seasat solar orientation is monitored by a pair of sun-aspect sensors. However, these sun-sensors are not used for orbital attitude control in the Seasat, since Seasat was designed as a sun-synchronous earth satellite. Sun-synchronous earth satellites have a fixed relation to the sun so that such vehicles do not need yaw-steering.

c. GLOBALSTAR's Asynchronous Precession

Figure 3:
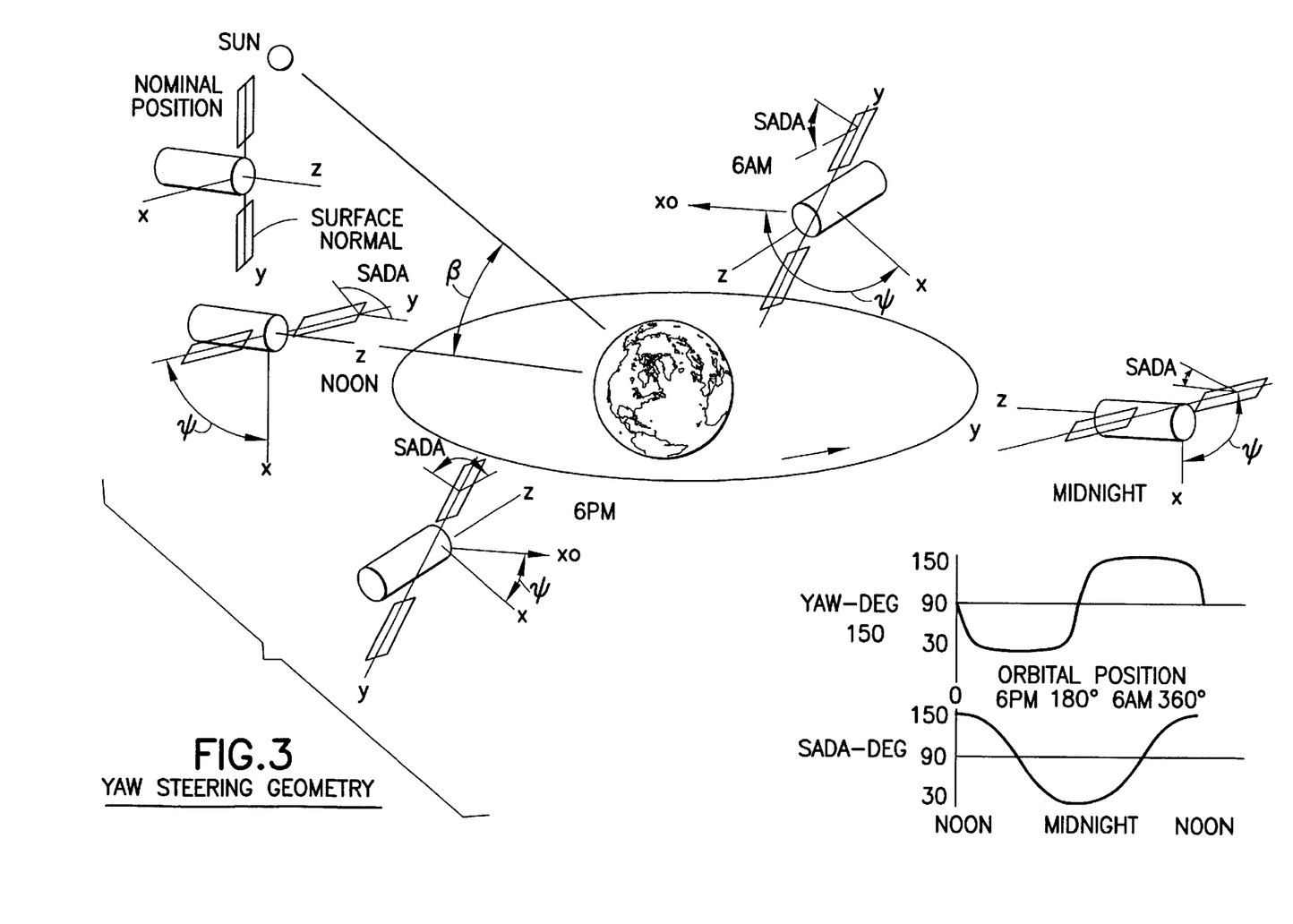
FIG. 3 is a diagrammatic illustration of the orientation of an orbiting spacecraft and its solar arrays in various positions around the orbit with respect to the sun.

Solar-powered satellites in orbits that precess, but are not sun-synchronous, can use either a combination of yaw-steering and rotary solar panel motion, or compound motion of the solar panels to track the sun. A nadir-pointing satellite could, alternatively be articulated between transmitter end and solar panels mounted at its opposite end to permit the two ends of the satellite to twist relative to each other, as was done by the Seasat platform. However, this requires the power from the panels to be supplied to the transmitter through an additional inefficient, failure-prone connector, such as a wiper assembly, or the like. This is unacceptable for high-powered, high-reliability relay satellites. FIG. 3 shows the yaw-steering motion needed to keep the solar panels of a sun-tracking solar-powered satellite continuously facing the sun at an optimal angle as the satellite orbits the earth. The solar array is rotated about a y-axis of the vehicle through the angle "SADA", and the vehicle is yawed through the angle "ψ". The magnitude of the yaw excursion variable ψ depends on the angle between the sun and the orbital plane, the angle β. In the limiting case that occurs when the sun is in the plane of the satellite's orbit, β=0 and only the SADA angle is variable. No yaw motion is needed. At higher β values both SADA and yaw must vary.

For the satellites of the GLOBALSTAR™ system, the precession of their orbits produces a beta angle "β" between the satellites' orbital planes and a line from the earth to the sun that varies from zero to about 75 degrees. At β=75°, a satellite must provide very large rotations of the solar array about the nadir-pointing z-axis and perpendicular to the pitch axis, and a very large SADA angle about the y-axis, to maintain solar-power efficiency.

If yaw-steering is not used, the secondary deflection of the solar array about that z-axis perpendicular to the pitch axis must be reduced, to prevent one of the solar panels from crossing into areas where they reduce the operating efficiency and coverage pattern of the satellite's relay operation each time they reach maximum yaw deflection, by interfering with the satellite's antennas.

This limit on the compound motion of the solar panels causes less-than-optimal sun tracking. Less-than-optimal sun tracking by the panels requires a substantial increase in their size, to offset the resulting decrease in efficiency. Very large arrays, however, are subject to gravity gradient perturbation effects, as well as being more expensive and massive. Thus compound motion of the solar panels is not a satisfactory solution of the problem.

If the GPS satellites' attitude control system could be adapted to provide the precision yaw-steering necessary for the system, both the satellite's structural integrity and the effectiveness of its antenna system would be preserved. However, this kind of precise attitude control requires a second, very accurate, continuously-controlled angular rate offset, so that the satellite's attitude points the solar panel normal to the sun instead of moving the solar panels themselves or twisting the satellite amidships, i.e., between the antenna and the solar panels.

While the use of momentum devices for both attitude sensing and attitude correction is a concept that is attractive for its simplicity, reliance upon momentum sensing rate-gyro instruments for attitude sensing is impractical because they are imprecise, as well as expensive. Also, rate gyro sensors are too susceptible to drift, which is especially problematic when a satellite is subject to a significant variation in the torques applied to it, as are satellites that provide yaw-steering. United States Patent, "Dynamic Bias For Orbital yaw Steering", U.S. Pat. No. 5,791,598, dated Aug. 11, 1998 enables similar yaw steering capability but its performance is limited to satellites with relatively small inertia properties and is applicable only to nearly circular orbits. The current submission applies to satellites with large inertia and differences in principal inertia mass distributions. The submission also can operate satisfactorily in highly elliptic orbits.

SUMMARY OF THE INVENTION

The present invention is directed to providing a steering system for earth-orbiting satellites involving a method and means for achieving smooth, accurate, continuous three axes pointing for such satellites that maintains programmed sun pointing for solar power generation, by allowing continuous controlled yaw steering to an arbitrary programmed yaw steering profile for a satellite of arbitrary and large inertia distribution on a highly elliptical orbit. An orbital attitude control system in accordance with the invention provides precise, pre-planned, yaw-steered solar orientation for the solar panels supplying power to a nadir-pointed communications satellite and significantly simplifies the design of the solar arrays by using the satellite pointing system to provide sun pointing in the yaw or azimuth axis.

In accordance with an embodiment of the present invention a continuous three axes satellite pointing system for a solar powered satellite is provided, the system comprising a body control module for producing three orthogonal axes body control torques, a momentum integration module, a momentum control module, and a program torque decoupling module. The program torque decoupling module de-couples the programmed motion parameters represented by the equation:

$$I_B\omega' + {}_B\omega X(I_B\omega + {}_BH)$$

In accordance with one method of the present invention, a method is provided for controlling a satellite's yaw motion, the method comprising the steps of yaw steering the satellite with a dynamic momentum bias; determining a vector for the dynamic momentum bias; comparing the vector with an orbital axis direction; and generating a dynamic momentum bias correction based on the comparison of the yaw vector with the yaw steering direction.

In accordance with another embodiment of the present invention, a satellite yaw steering momentum system for dynamically controlling satellite yaw is provided, the system comprising a yaw control system. The yaw control system comprises a closed loop yaw control system, a contemporaneous open loop yaw control system, and a wheel momentum control system. The wheel momentum control system comprises an integration module, a translation module connected to the integration module, and a programmed motion decoupling module. The programmed motion de-couples the programmed motion parameters represented by the equation:

$$I_B\omega' + {}_B\omega X(I_B\omega + {}_BH)$$

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 4:
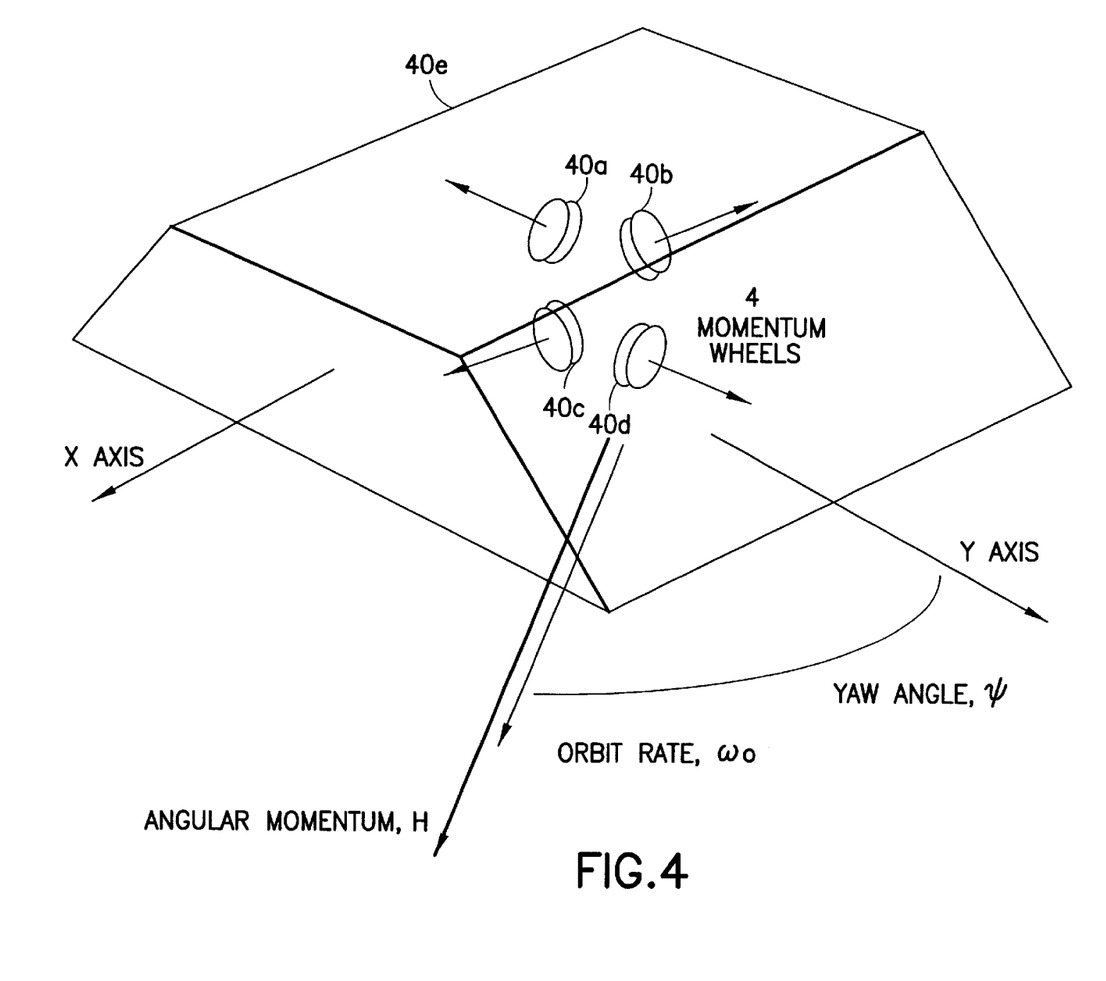
FIG. 4 is a diagrammatic illustration of an array of momentum wheels, the total vector momentum of which is aligned to the orbit rate vector while the spacecraft is yaw steered.
Figure 5:
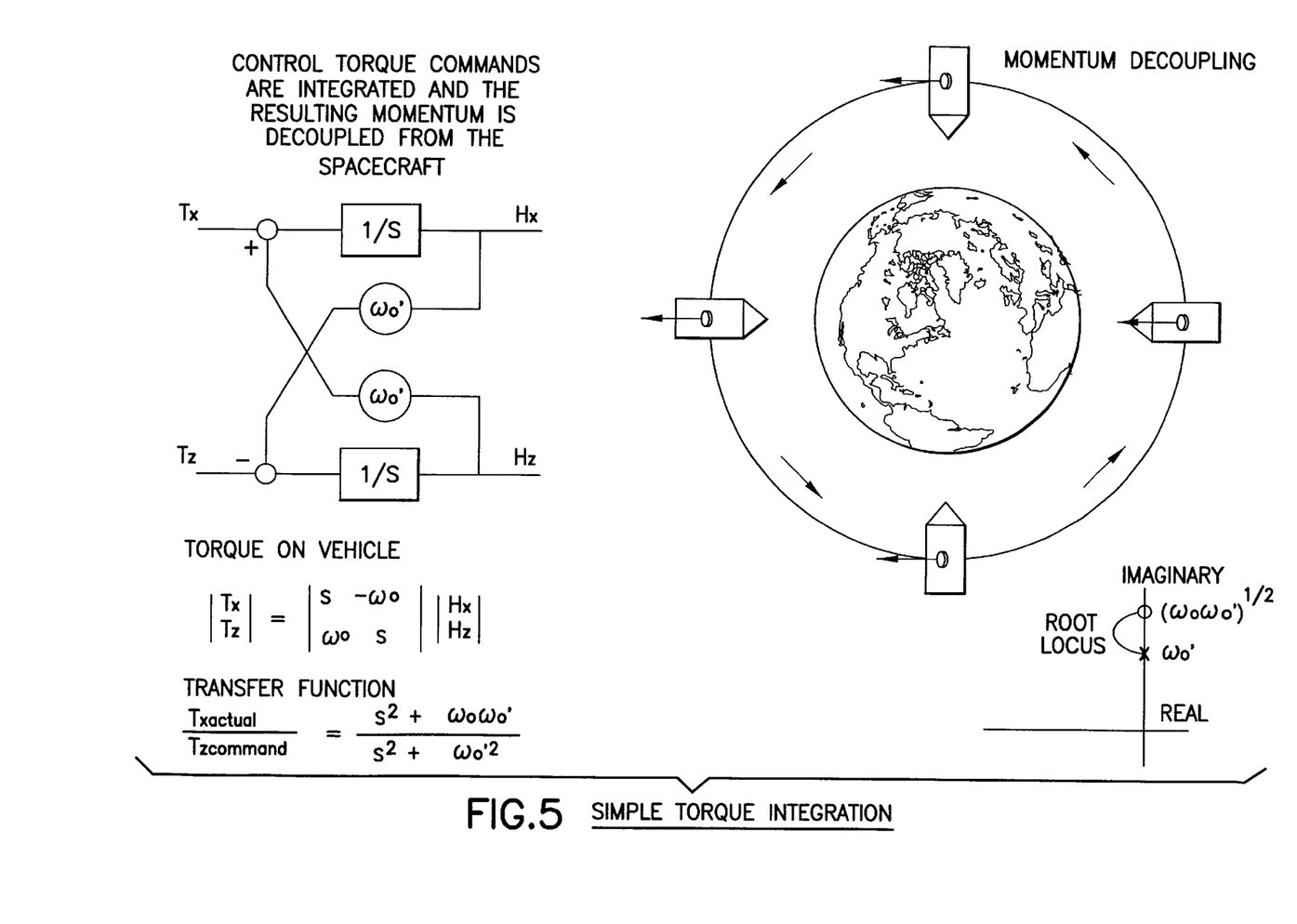
FIG. 5 shows a simple roll-yaw decoupling integration.
Figure 6:
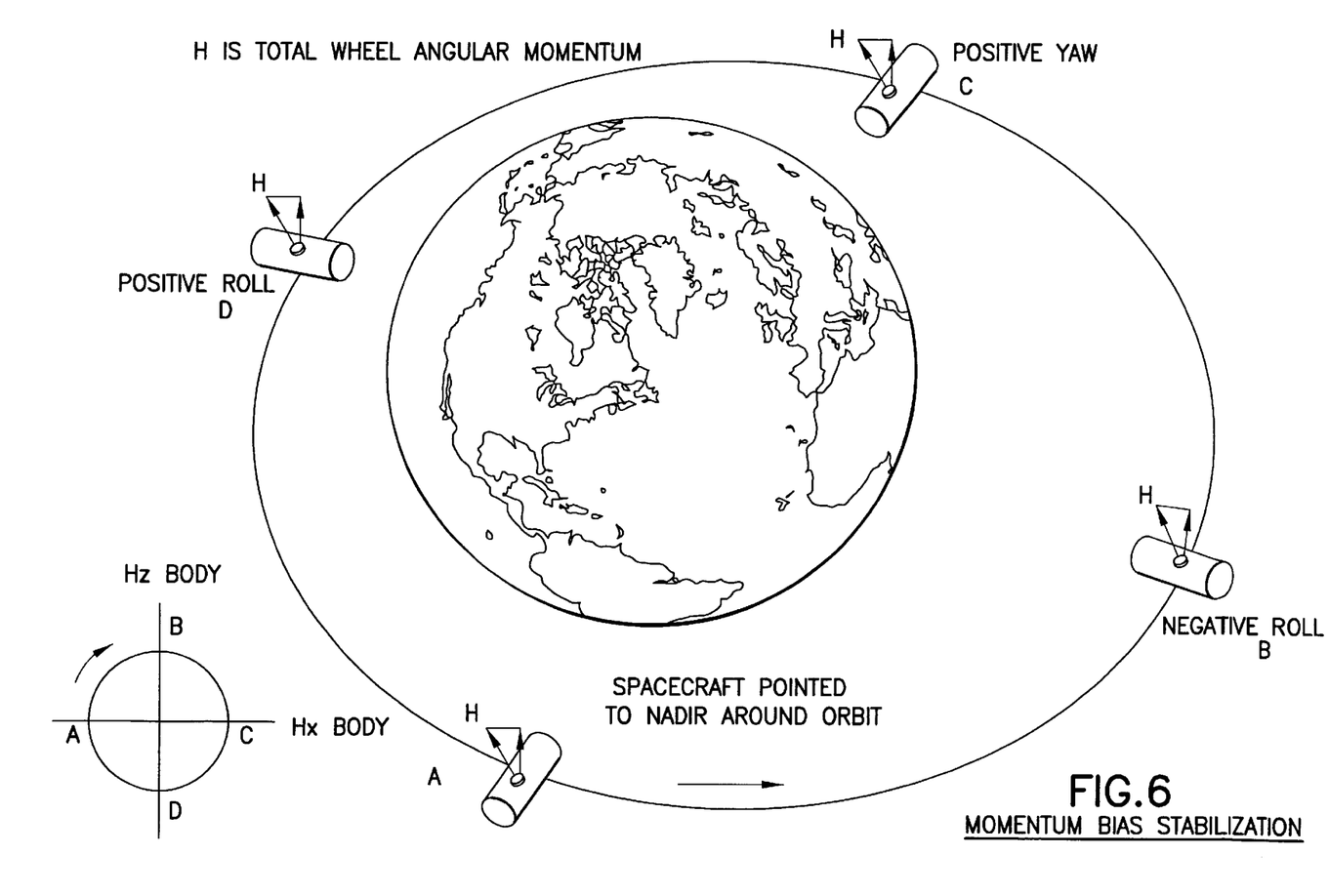
FIG. 6 shows a spacecraft with a bias momentum with pitch control only.
Figure 7:
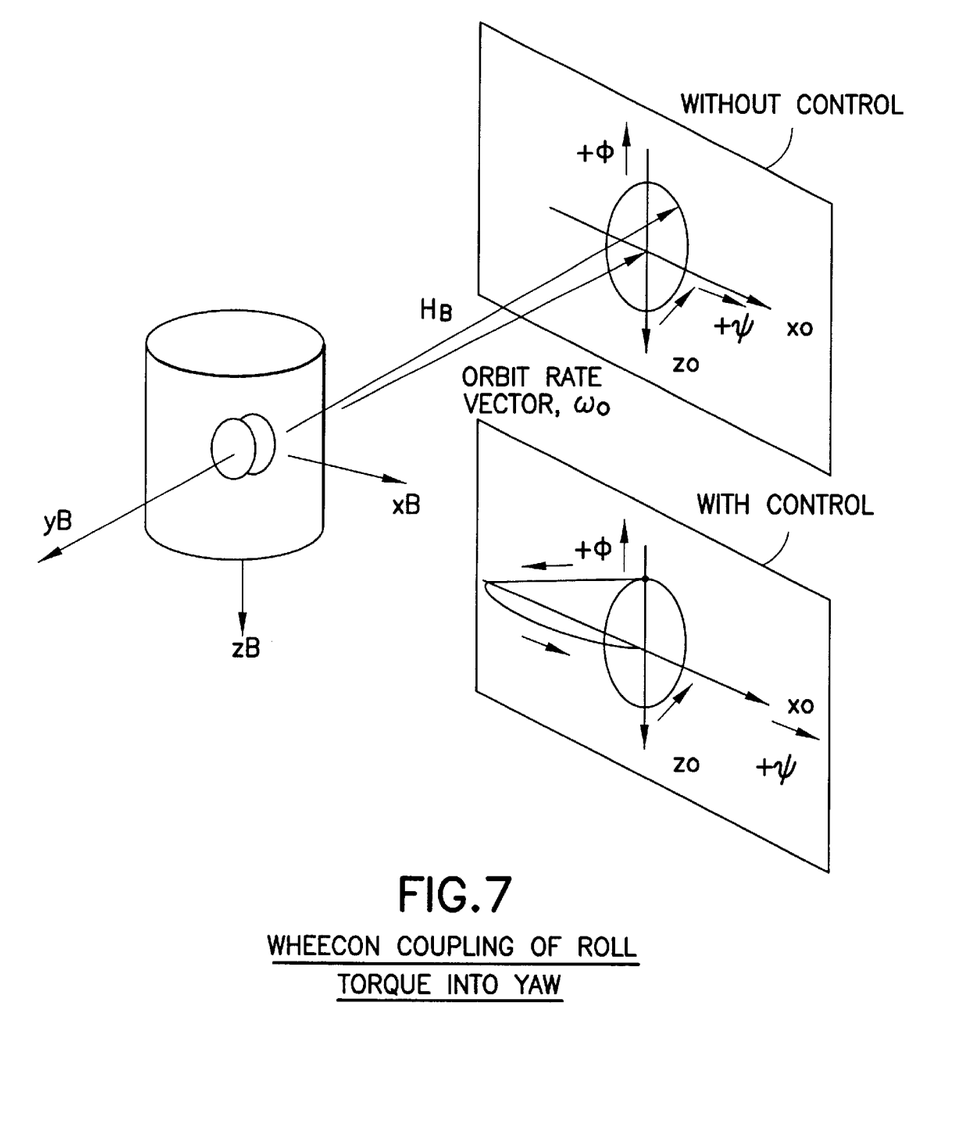
FIG. 7 shows the yaw precession motion of the bias momentum vector in the local horizontal plane as induced by the roll control torque.
Figure 8:
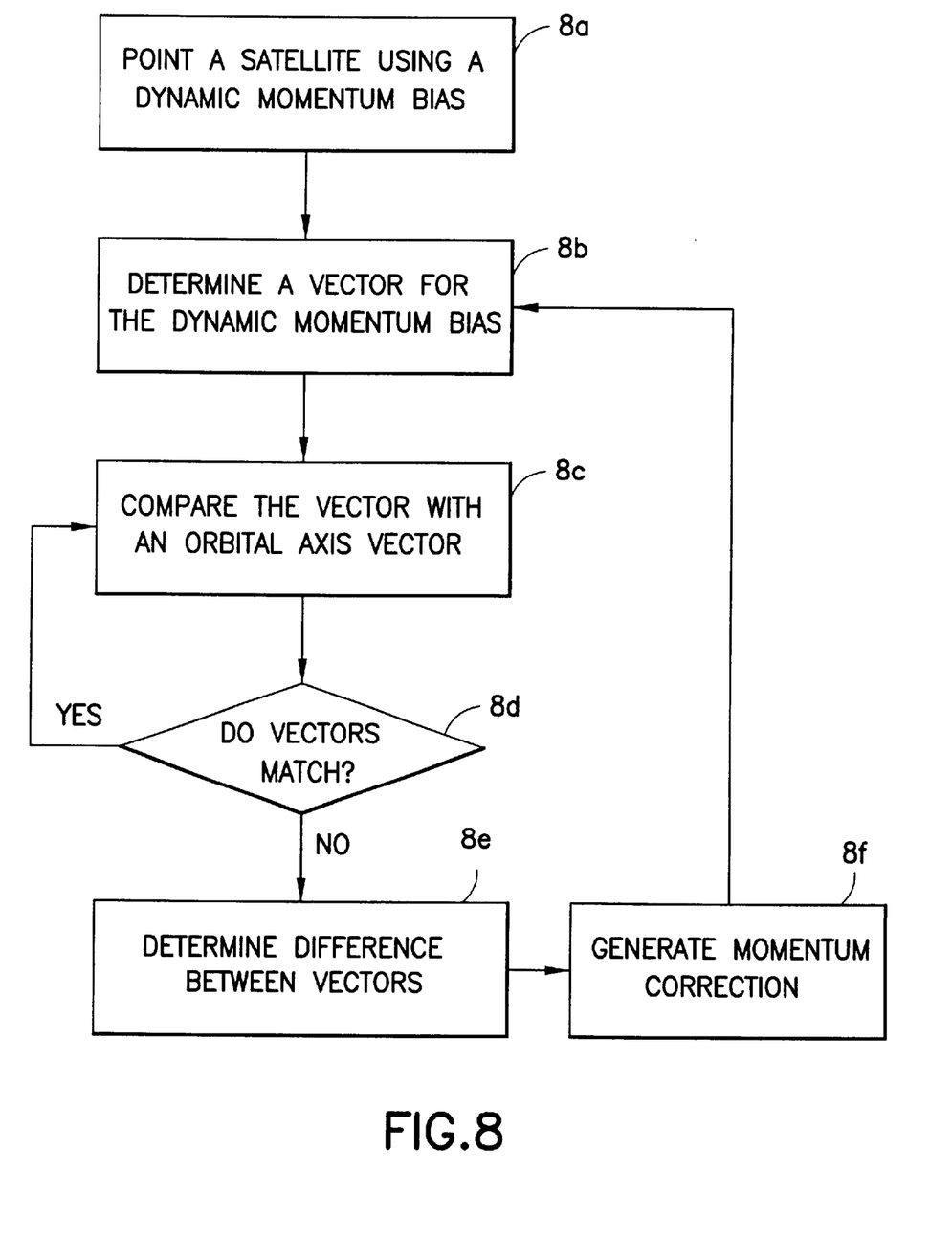
FIG. 8 is a flowchart of one method of dynamically controlling a satellite's yaw motion.

Although the present invention will be described with reference to the single embodiment shown in the drawings, it should be understood that the present invention can be embodied in many alternate forms of embodiments. Principal satellite attitude sensing comes from pitch and roll signal derived from earth sensors. The third axis is controlled while being yaw steered by a dynamic momentum bias which is generated and maneuvered internally by a set of reaction/momentum wheels. The vehicle wheel momentum is manipulated such that the vector sum of momentum is maintained nearly aligned to the orbital negative pitch axis. FIG. 4 shown a pictorial of an array of wheels whose total vector momentum is aligned to the orbit rate vector while the spacecraft is yaw steered. The Momentum Bias attitude control for a spacecraft is based on the Wheel-Control or Wheecon coupling of orbital roll torque into the yaw axis. The dynamics can be represented in three stages. First consider a spacecraft with a bias momentum with pitch control only as shown in FIG. 6. The momentum without roll-yaw control or external disturbances in this case stays fixed in direction by inertia. The next step is to have roll control in addition to pitch control imposed. This condition forces the bias momentum vector to be in the local horizontal plane where it can oscillate back and forth in yaw in the manner of a gyrocompass. This motion in a spacecraft would be un-damped. The yaw precession in this gyrocompass motion is induced by the roll control torque as shown in FIG. 7. A third step is to use the measurable roll torque or roll control which is proportional to the yaw precession rate as a signal to form a yaw torque. The resulting yaw torque provides damping of the yaw oscillation and controlled yaw steering. A feature of the present invention provides continuous controlled yaw steering to an arbitrary programmed yaw steering profile. Unlike previous systems this feature of the present invention is applicable for a satellite of arbitrary and large inertia distribution on a highly elliptical orbit. Another feature of the present invention is to provide smooth, accurate, and continuous three axes pointing for a satellite that maintains programmed sun pointing for solar power generation. The use of this invention significantly simplifies design of solar arrays on satellite systems by using the satellite pointing to provide sun pointing in the yaw or azimuth axis. An important element of the control system is Momentum Integration and Decoupling. This system converts commanded orbit axes referenced control torque commands to wheel momentum that rotates the internal momentum to disassociate it from the dynamical coupling with the vehicle combined orbital and programmed yaw motion. The net transfer function between commanded control torque and the resulting physical actual torque on the spacecraft is ideally unity. This effective elimination or decoupling of dynamical momentum coupling allows use of simplified closed loop control laws based on attitude signals coordinated in the body reference frame. FIG. 5 shows a simple roll-yaw decoupling integration. The control torque commands, Tx and Tz are integrated/and coupled with the orbit rate, ωo of the orbit coordinates with respect to inertial space. These integrators then cause any internal roll momentum Hx, or yaw momentum, Hz to be transferred between axes in such a way that the net momentum vector stays fixed with respect inertial space. FIG. 8 describes the method for determining and correcting a difference between the satellite's momentum vector and an orbital axis vector. The satellite is orientated by the dynamic momentum bias 8a, a vector is determined 8b and compared 8c with the orbital axis vector. If vectors match 8d the compare process is continuously repeated. Otherwise, a difference is determined 8e and a momentum correction is generated 8f. Thus, programmed satellite motion can be superimposed on the stabilized momentum bias system, i.e., dynamic momentum bias, by commanding internal wheel momentum changes corresponding to a calculated momentum derived for the desired motion profile. The physics of momentum conservation assure that the vehicle angular response is equal that the programmed motion.

Figure 1:
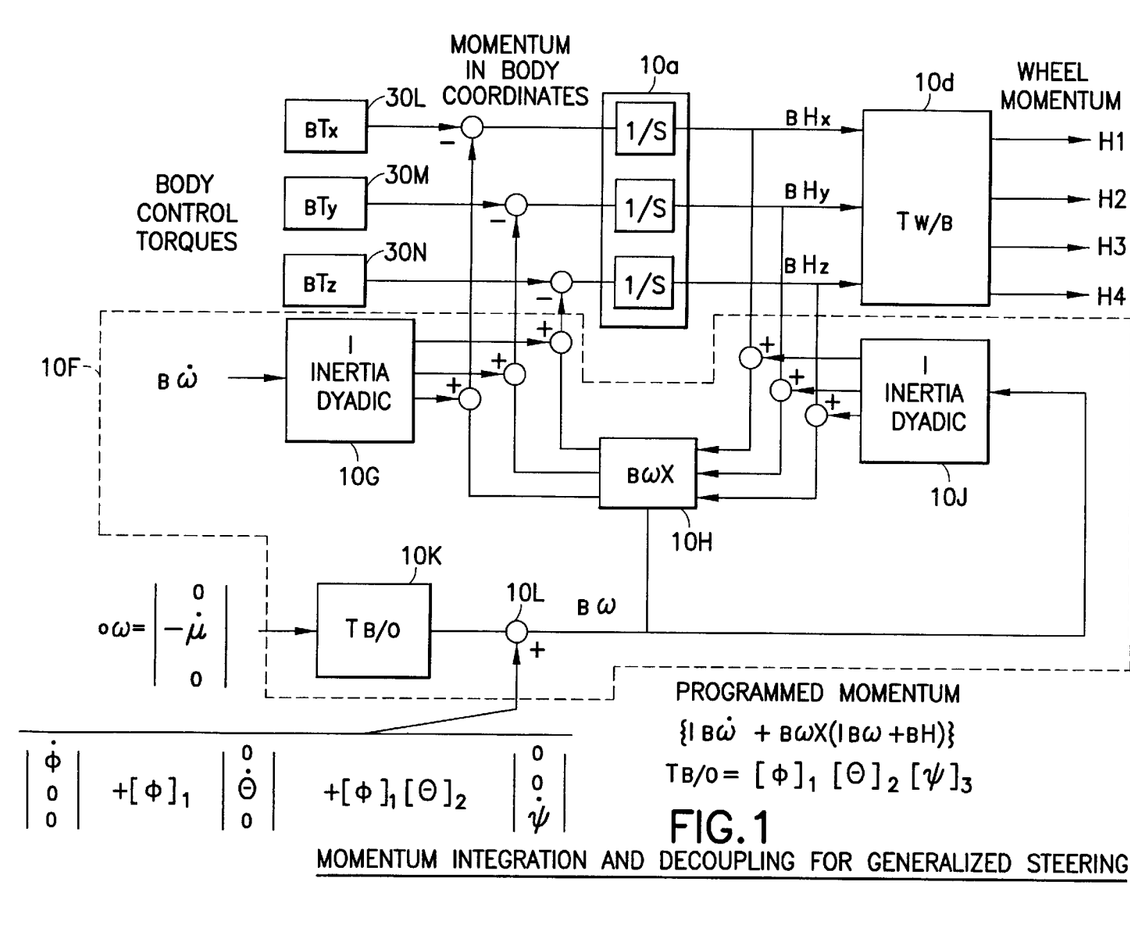
FIG. 1 is a diagrammatic illustration of momentum integration and decoupling for yaw steering in an Earth orbiting satellite.
Figure 2:
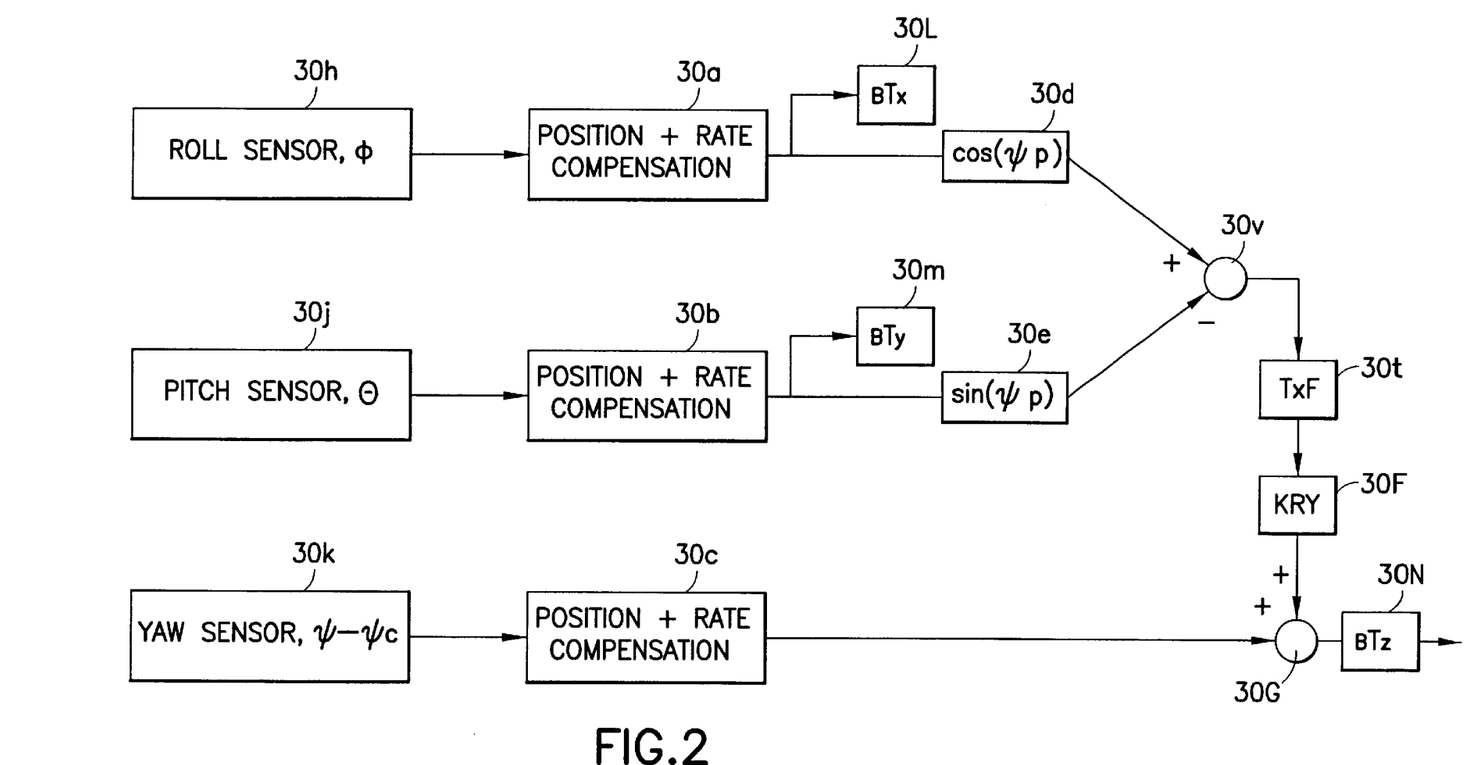
FIG. 2 is a diagrammatic illustration of the attitude control laws.

Referring now to FIGS. 1 and 2, there is shown a diagrammatic illustration of momentum integration and decoupling for yaw steering in an Earth orbiting satellite and a diagrammatic illustration of the attitude control laws incorporating features of the present invention, respectively.

The system generally comprises a control law system 30a–30k (FIG. 2), a momentum integration and decoupling system (FIG. 1), and momentum control devices 40a–40d such as shown in FIG. 4.

The control law system shown in FIG. 2 generally comprises three orthogonal axis controls for the satellite; a roll control, a pitch control, and a yaw control. The roll control comprises a horizon sensor 30h, a position and rate compensator 30a, and a device 30d for extracting yaw information from the roll signal. The pitch control generally comprises similar elements: a pitch sensor 30j, a pitch and rate compensator 30b, and a device 30e for extracting yaw information from the pitch signal. The outputs of the roll and pitch compensators 30a, 30b for the body control torques $_B T_x$ and $_B T_y$ respectively. The yaw control comprises a yaw sensor 30k (when the sun is not eclipsed or nearly co-aligned with the direction of the earth), a position and rate compensator 30c, a summing node 30g, and a gain node 30f. Yaw from the roll and pitch signal is determined by combining components of the roll and pitch signals through devices 30d, 30e to summing node 30v; The output of summing node 30v is coupled to device 30t then through gain device 30f to summing node 30g. The output of summing node 30g follows:

$$T_{xF} = |1 \ 0 \ 0| * T_{O/B} \begin{vmatrix} T_{xb} \\ T_{yb} \\ 0 \end{vmatrix}$$

$$= \cos\theta_c\cos\psi_p T_{xb} + (-\cos\phi_c\sin\psi_p + \sin\phi_c\sin\theta_c\cos\psi_p)T_{yb}$$

When there are no roll or pitch offsets the equation reduces to:

$$T_{xF} = |1 \ 0 \ 0| * T_{O/B} \begin{vmatrix} T_{xb} \\ T_{yb} \\ 0 \end{vmatrix} = \cos\psi_p T_{xb} + -\sin\psi_p T_{yb}$$

Thus the "Wheecon" z orbit axis torque is KRY*TxF and Tbz is equal to:

$$\begin{vmatrix} T_{xbz} \\ T_{ybz} \\ T_{zbz} \end{vmatrix} = T_{B/O} \begin{vmatrix} 0 \\ 0 \\ KRY*TxF \end{vmatrix} = \begin{vmatrix} -\sin\theta \\ \sin\phi\cos\theta \\ \cos\phi\cos\theta \end{vmatrix} KRF*TxF$$

Note that this signal is always present whether or not the yaw sensor is available. When the yaw sensor 30k is available the yaw body control torque $_BTz$ is directly available to summing node 30g. Note that the direct signal from yaw sensor 30k through position and rate compensator 30c to summing node 30g is a stronger signal than the derived signal from gain device 30f and dominates the output of summing node 30g. Thus a permanent connection such as the summing node 30g, instead of a switching arrangement, permits an uninterrupted yaw body control torque for smoother satellite control.

The momentum integration and decoupling system shown in FIG. 1 generally comprises an integration module 10a, a transformation module 10d, and a programmed motion decoupling module 10f. The integration module integrates body control torques 30l–30n to form body momentums in three orthogonal axis as shown in FIG. 1. The body momentums are translated to wheel momentum control signals by the transformation module 10d.

In general, roll and pitch body torques $_BTx$ and $_BTy$ are determined by the roll and pitch sensors 30h, 30j, respectively. Yaw body torque $_BTz$ is either directly sensed or derived as described above. However, these body torque signals also include body torques induced by the programmed motion as the body orbits the planet as well as torques due to external factors. Thus in order to produce the wheel momentum control signals to correct for deviations not a result of programmed motion the programmed motion must be de-coupled or subtracted out from the body torques $_BTx$, $_BTy$, and $_BTz$ before the torques are converted to wheel momentum control signals. This is accomplished by the programmed motion decoupling module 10f.

The following derives the programmed torques to be de-coupled from the wheel momentum control signals. Total momentum is defined as:

$$\text{TOTAL\_MOMENTUM} = {_TH} = I_B\omega + {_BH}$$

-continued where $_TH$ = total momentum $I$ = total inertia $$W = \begin{vmatrix} \omega_x \\ \omega_y \\ \omega_z \end{vmatrix} = A \begin{vmatrix} \phi' \\ \theta' \\ \psi' \end{vmatrix} - \mu'B$$

$w$ = angular velocity $_BH$ = body momentum

Total momentum is differentiated to provide total torque:

TORQUE=$dTH/dt = {_BH'} + \{I_B\omega' + {_B}\omega X(I_B\omega + {_BH})\}$=TorqueExternal+Control Thus momentum wheel torque becomes $_WH' = -\{I_B\omega' + {_B}\omega X(I_B\omega + BH)\}$+CONTROL_TERMS which when neglecting the CONTROL_TERMS as negligible gives the programmed motion torques. Expanding the programmed motion torques gives:

$$\{I_B\omega' + {_B}\omega X(I_B\omega + BH)\} = \begin{vmatrix} (I_y - I_z - I_x)\cos(\psi_P\psi'_P\mu') - I_x\sin(\psi_P)\mu'' \\ (I_z - I_x - I_y)\sin(\psi_P\psi'_P\mu') - I_y\cos(\psi_P)\mu'' \\ (I_y - I_x)\sin(\psi_P)\cos(\psi_P\mu')^2 + I_z\psi'' \end{vmatrix} +$$

$$\begin{vmatrix} -\psi'_P H_{y-}\mu' H_z\cos(\psi_P) \\ \psi'_P H_{x+}\mu' H_z\sin(\psi_P) \\ \mu'[H_x\cos(\psi_P) - H_y\sin(\psi_P)] \end{vmatrix}$$

Thus to de-couple the programmed motion torques the orbit parameters must be transformed from orbit to body parameters via the transformation module 10k shown in FIG. 1. This is shown by the following:

$$T_{B/O} = [\phi]_1[\theta]_2[\psi]_3$$

$$T_{B/O} = \begin{vmatrix} \cos\theta\cos\psi & \cos\theta\sin\psi & -\sin\theta \\ -\cos\phi\sin\psi + \sin\phi\sin\theta\cos\psi & \cos\phi\cos\psi + \sin\phi\sin\theta\sin\psi & \sin\phi\cos\theta \end{vmatrix}$$

Thus the body and Euler rates are related as follows:

$$\begin{vmatrix} \omega_x \\ \omega_y \\ \omega_z \end{vmatrix} = \begin{vmatrix} \phi' \\ 0 \\ 0 \end{vmatrix} + [\phi]_1 \begin{vmatrix} 0 \\ \theta' \\ 0 \end{vmatrix} + [\phi]_1[\theta]_2 \begin{vmatrix} 0 \\ 0 \\ \psi' \end{vmatrix} + [\phi]_1[\theta]_2[\psi]_3 \begin{vmatrix} 0 \\ -\mu' \\ 0 \end{vmatrix}$$

where $\phi'$ = pitch_angle_rate $\theta'$ = roll_angle_rate $\psi'$ = yaw_angle_ate $\mu'$ = orbit_angle_rate and $$\begin{vmatrix} \omega_x \\ \omega_y \\ \omega_z \end{vmatrix} = \begin{vmatrix} 1 & 0 & -\sin\theta \\ 0 & \cos\phi & \sin\phi\cos\theta \\ 0 & -\sin\phi & \cos\phi\phi\cos\theta \end{vmatrix} \begin{vmatrix} \phi' \\ \theta' \\ \psi' \end{vmatrix} - \mu' \begin{vmatrix} \cos\theta\sin\psi \\ \cos\phi\cos\psi + \sin\phi\sin\theta\sin\psi \\ -\sin\phi\cos\psi + \cos\phi\sin\theta\sin\psi \end{vmatrix}$$

Rewriting the above equation as $$\omega = \begin{vmatrix} \omega_x \\ \omega_y \\ \omega_z \end{vmatrix} = A \begin{vmatrix} \phi' \\ \theta' \\ \psi' \end{vmatrix} - \mu' B$$

Differentiating the above equation results in $$\omega' = A \begin{vmatrix} \phi'' \\ \theta'' \\ \psi'' \end{vmatrix} - \mu' B - \mu' B'$$

where:

$$A = \begin{vmatrix} 1 & 0 & -\sin\theta \\ 0 & \cos\phi & \sin\phi\cos\theta \\ 0 & -\sin\phi & \cos\phi\phi\cos\theta \end{vmatrix}$$

$$A' = \begin{vmatrix} 0 & 0 & -\cos\theta\theta' \\ 0 & -\sin\phi\phi' & \cos\phi\phi'\cos\theta - \sin\phi\sin\theta\theta' \\ 0 & -\cos\phi\phi' & -\sin\phi\phi'\cos\theta - \cos\phi\sin\theta\theta' \end{vmatrix}$$

$$B = \begin{vmatrix} \cos\theta\sin\psi \\ \cos\phi\cos\psi + \sin\phi\sin\theta\sin\psi \\ -\sin\phi\cos\psi + \cos\phi\sin\theta\sin\psi \end{vmatrix}$$

and $$B' = \begin{vmatrix} -\sin\theta\theta'\sin + \cos\theta\cos\psi \\ -\sin\phi\phi'\cos\psi - \cos\phi\sin\psi\psi' + \cos\phi\phi'\sin\theta\sin\psi + \sin\phi\cos\theta\theta'\sin\psi + \sin\phi\sin\theta\cos\psi\psi' \\ -\cos\phi\phi'\cos\psi = \sin\phi\sin\psi\psi' - \sin\phi\phi'\sin\theta\sin\psi + \cos\phi\cos\theta\theta'\sin\psi + \cos\phi\sin\theta\cos\psi\psi' \end{vmatrix}$$

Thus the terms described above describe the programmed momentum that are de-coupled from the body control torques. The programmed motion is de-coupled as shown in FIG. 1 by programmed motion decoupling module 10f.

The attitude control requirements that this system meets are to control spacecraft pitch and roll while providing yaw motion according to a prescribed profile to keep the sun direction normal to the solar panel axes. In addition, the prescribed profile can make excursions to Normal Mode zero yaw orientation for orbit adjust burns followed by a subsequent return to the sun direction profile. Also, while the system has been described with respect to controlling yaw other embodiments of the invention could be used to control roll or pitch.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A satellite yaw steering momentum system for dynamically controlling satellite yaw, the system comprising:
    a yaw control system wherein the yaw control system comprises:
        a closed loop yaw control system;
        a contemporaneous open loop indirect yaw control system, the contemporaneous open loop indirect yaw control system adapted to operate in conjunction with the closed loop yaw control system to provide substantially continuous controlled yaw steering to an arbitrary programmed yaw steering profile;
    a wheel momentum control system connected to the yaw control system wherein the wheel momentum control system comprises;
        an integration module;
        a translation module connected to the integration module; and
        a programmed motion decoupling module connected to the integration module, for decoupling programmed motion parameters represented by the equation:

$I_B\omega' +_B \omega X(I_B \omega +_B H)$.

2. A method for controlling a satellite's yaw motion, the method comprising the steps of:
    yaw steering the satellite with a dynamic momentum bias;
    determining a vector for the dynamic momentum bias, wherein the step of determining the vector comprises the step of determining a yaw component, wherein the step of determining the yaw component comprises the steps of:
        a yaw component derived from yaw measurement, roll measurement, and pitch measurement;
    comparing the vector with an orbital axis direction; and
    generating a dynamic momentum bias correction based on the comparison of the yaw component with the yaw steering direction.

3. A method as in claim 2 wherein the step of yaw steering the satellite with the dynamic momentum bias comprises the step of generating the dynamic momentum bias with at least one momentum wheel.

4. A method as in claim 2 wherein the step of determining the vector for the dynamic momentum bias comprises the step of vector summing at least two momentum vectors.

5. A method as in claim 2 wherein the step of comparing the vector with the orbital axis direction comprises the step of comparing the vector with the orbital negative pitch axis.

6. A method as in claim 2 wherein the step of generating the dynamic momentum bias correction comprises the steps of:
    generating body control torques;
    decoupling programmed body torques from body control torques;
    integrating the body control torques after decoupling programmed body torques to form body momentum parameters; and translating the body momentum parameters to form the dynamic momentum bias correction.

7. A method as in claim 6 wherein the step of generating body control torques comprises the steps of:
using a roll sensor to generate a roll body torque;
using a pitch sensor to generate a pitch body torque
generating a yaw torque wherein the steps of generating a yaw torque comprises the steps of:
generating a first yaw torque based upon the roll torque and the pitch torque; or contemporaneously sensing yaw directly from a yaw sensor and generating a second yaw torque; and combing the first yaw torque with the second yaw torque.

8. A method as in claim 6 wherein the step of decoupling programmed body torques from body control torques comprises the step of decoupling programmed motion parameters represented by the equation:

$$I_B\omega' +_B\omega X(I_B\omega +_B H).$$

9. A method as in claim 6 wherein the step of translating the body momentum parameters to form the dynamic momentum bias correction comprises the step of forming at least one dynamic momentum bias correction.

10. A method as in claim 9 wherein the step of forming at least one dynamic momentum bias correction comprises the step of forming at least one dynamic momentum wheel bias correction.

11. A continuous three axes satellite pointing system for a solar powered satellite, the system comprising:
a body control module for producing three orthogonal axes body control torques;
a momentum integration module connected to the body control module;
a program torque decoupling module connected to the momentum integration module for decoupling parameters represented by the equation:

$$I_B\omega' +_B\omega X(I_B\omega +_B H)$$

and
a momentum control module connected to the momentum integration module.

12. A continuous three axes satellite pointing system for a solar powered satellite, the system comprising:
a body control module for producing three orthogonal axes body control torques, wherein the body control module for producing three orthogonal axes body control torques comprises;
a roll body control torque generator connected to a roll sensor;
a pitch body control torque generator connected to a roll sensor and the roll body control torque generator;
a yaw body control torque generator connected to the pitch body control torque generator and the roll body control torque generator or contemporaneously connected to a yaw sensor;
a momentum integration module connected to the body control module;
a program torque decoupling module connected to the momentum integration module for decoupling parameters represented by the equation:

$$I_B\omega' +_B\omega X(I_B\omega +_B H)$$

and
a momentum control module connected to the momentum integration module.

13. A continuous three axes satellite pointing system for a solar powered satellite, the system comprising:
a body control module for producing three orthogonal axes body control torques;
a momentum integration module connected to the body control module;
a program torque decoupling module connected to the momentum integration module for decoupling parameters represented by the equation:

$$I_B\omega' +_B\omega X(I_B\omega +_B H)$$

wherein the program torque decoupling module comprises an orbital to body transformation controller; and
a momentum control module connected to the momentum integration module.

14. An artificial satellite constellation, the artificial satellite constellation comprising:
at least one artificial satellite, the at least one artificial satellite comprising:
a first set of orbital parameters, the first set of orbital parameters comprising:
a first eccentricity value;
a first inclination to the equatorial plane;
a dynamic attitude controller, the dynamic attitude controller comprising:
a roll controller;
a pitch controller;
a yaw controller; the yaw controller comprising:
a closed loop yaw control system, the closed loop yaw control system adapted to measure actual yaw;
a contemporaneous open loop yaw control system, the contemporaneous open loop yaw control system adapted to derive actual yaw from data provided by the pitch controller and data provided by the roll controller;
a wheel momentum control system connected to the yaw control system wherein the wheel momentum control system comprises;
an integration module;
a translation module connected to the integration module; and
a programmed motion decoupling module connected to the integration module, for decoupling programmed motion parameters represented by the equation:

$$I_B\omega' +_B\omega X(I_B\omega +_B H).$$

15. An artificial satellite constellation as in claim 14 wherein the first eccentricity value is about 0.26.

16. An artificial satellite constellation as in claim 14 wherein the first inclination varies from 40°–70°.

17. A satellite attitude control system comprising:
at least one roll sensor for detecting satellite roll about a first predetermined axis;

at least one pitch sensor for detecting satellite pitch about a second predetermined axis;

a yaw steering control system, the yaw steering control system comprising:

a closed loop yaw control system;

a contemporaneous open loop indirect yaw control system, the contemporaneous open loop indirect yaw control system adapted to operate in conjunction with the closed loop yaw control system to provide substantially continuous controlled yaw steering to an arbitrary programmed yaw steering profile, the contemporaneous open loop indirect yaw control system deriving its input from the at least one roll sensor and the at least one pitch sensor;

a momentum control system connected to the yaw control system wherein the momentum control system comprises;

an integration module;

a translation module connected to the integration module; and a programmed motion decoupling module connected to the integration module, for decoupling programmed motion parameters represented by the equation:

$$I_B\omega' + {}_B\omega X(I_B\omega + {}_BH).$$

* * * * *